United States Patent [11] 3,627,624

| [72] | Inventors | John Anthony Kreuz<br>Williamsville, N.Y.;<br>Eugene Henry Zytkus, Wilmington, Del. |
|---|---|---|
| [21] | Appl. No. | 858,494 |
| [22] | Filed | Sept. 16, 1969 |
| [45] | Patented | Dec. 14, 1971 |
| [73] | Assignee | E. I. du Pont de Nemours and Company<br>Wilmington, Del. |

[54] LAMINAR STRUCTURES OF POLYIMIDES AND METHOD OF MANUFACTURE
28 Claims, No Drawings

[52] U.S. Cl. .................................................... 161/165,
117/47, 156/272, 156/306, 156/331, 156/333,
161/189, 161/216

[51] Int. Cl. ..................................................... B32b 25/16,
B32b 27/16
[50] Field of Search ............................................. 117/47;
156/272, 306, 331, 333; 161/165, 189, 216

[56] References Cited
UNITED STATES PATENTS

| 3,284,277 | 11/1966 | Bonacci et al. | 156/272 X |
| 3,454,461 | 7/1969 | Paxton | 156/272 X |
| 3,455,774 | 7/1969 | Lindsey et al. | 156/272 X |

Primary Examiner—Leland A. Sebastian
Attorney—Claude L. Beaudoin

ABSTRACT: A laminar article is provided of a layer of a polyimide and a layer of a fluorocarbon polymer which has been subjected to an electrical discharge treatment in an atmosphere containing acetone, which structure is heat-sealable and suitable for electrical insulation uses.

LAMINAR STRUCTURES OF POLYIMIDES AND METHOD OF MANUFACTURE

The present invention relates to laminar structures and a method of manufacture thereof. More particularly, the present invention is directed to improvements in and relating to heat-sealable laminar articles of polyimides and fluorinated polymeric materials and to a method of manufacture thereof.

Laminar articles of polyimide polymeric materials and fluorocarbon polymers are known articles of manufacture desirable for many diverse uses because characterized by a unique combination of physical properties not separately possessed by each individual constituent material thereof. The main drawback of such laminar structures resides in the lack of an efficient bond between the layers of the laminar structure such as is necessary to provide an article of sufficient durability, especially when exposed to environments of high moisture content or after aging at elevated temperatures. Numerous techniques have evolved for preparing laminar structures of polyimides and fluorocarbon polymers such as, for example, that disclosed in U.S. Pat. No. 3,179,634, which describes a laminar structure of a polyimide and a fluorocarbon polymer wherein the composite is formed by treating the surface of a self-supporting film of a tetrafluoroethylene/hexafluoropropylene copolymer with an electrical discharge to improve surface adherability, coating the treated film by solvent-casting thereon a polyamide-acid precursor of the desired polyimide, and then converting the polyamide-acid layer to polyimide by treatment with acetic anhydride and pyridine, followed by solvent removal in a vacuum oven at 100° C. In addition to the foregoing, British Pat. No. 1,144,453 describes a process for preparing laminar structures of polyimides and fluorocarbon polymers by pressing together in a heated nip roll a film structure of polyimide and a fluorocarbon polymer film structure that has been subjected to an electrical discharge treatment between spaced electrodes in the presence of a vapor of such materials as glycidyl methacrylate, carbon tetrachloride, diethyl sulfone, etc. The widely different techniques described in the aforementioned patents attests to the empirical nature of the bonding mechanism between polyimide films and fluorocarbon films and the continuous search for methods and processes as will provide laminar structures of such films having yet better bonds between the layers thereof. It is, therefore, the principal object of the present invention to provide a novel laminar structure of polyimide and fluorocarbon polymeric materials characterized by improved bond strength especially when subjected to aging at elevated temperatures.

According to the present invention there is provided a laminar structure comprising at least one layer of a polyimide and at least one layer of a fluorocarbon polymeric material that has been subjected to an electrical discharge treatment in an atmosphere containing acetone. The laminar structure preferably comprises at least one layer of polyimide and at least one layer of a copolymer of hexafluoropropylene and tetrafluoroethylene. In another embodiment, the laminar structure comprises at least one layer of polyimide and at least one layer of a copolymer of between about 5 percent and about 50 percent by weight, based upon the total copolymer weight, of hexafluoropropylene and between about 50 percent and about 95 percent by weight, based upon the total copolymer weight, of tetrafluoroethylene.

According to the present invention, there is further provided a method of manufacture for making laminar structures which comprises laminating a base layer of a polyimide film having a moisture content below about 1 percent and preferably below about 0.5 percent by weight, to a film of a fluorocarbon polymer that has been subjected to electrical discharge treatment in an atmosphere of acetone, at a temperature in the range of 240° to 280° C. at a pressure in excess of about 10 pounds per square inch for a time of at least 0.01 second. The laminate may subsequently be optionally heated to a temperature in the range of 350° to 500° C. for at least 1 second.

The laminar structure of the invention is characterized by at least one layer of a polyimide of the following recurring structural unit:

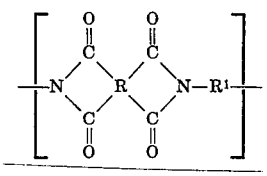

wherein R is a tetravalent organic radical containing at least two carbon atoms and no more than two carbonyl groups of said recurring unit are attached to any one carbon atom of said tetravalent radical; and $R^1$ is a divalent radical containing at least two carbon atoms, the nitrogen atoms of adjacent polyimide units being attached to a separate carbon atom of said divalent radical. More specifically, R is a tetravalent aromatic radical and the four carbonyl groups are attached directly in two pairs to separate carbon atoms in an aromatic ring, and each pair of carbonyl groups are attached to adjacent (i.e., ortho or peri) carbon atoms in a ring of the R radical. Preferably, R contains at least one ring of six carbon atoms characterized by benzenoid unsaturation. Representative tetravalent aromatic organic R radicals include the following and substituted derivatives thereof:

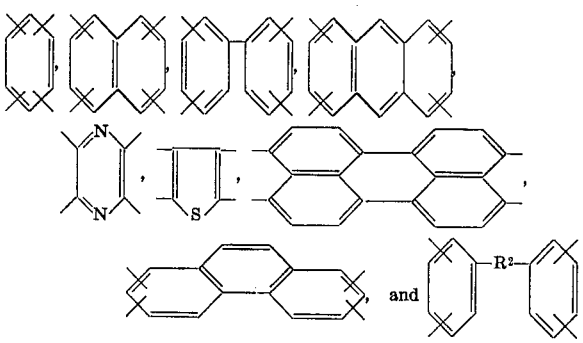

where $R^2$ is alkylene of 1–3 carbon atoms, oxygen, sulfur, or one of the following:

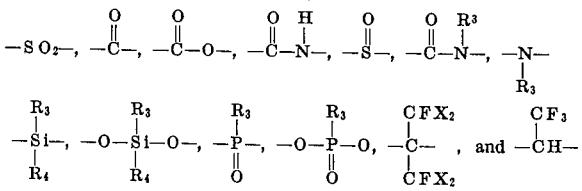

wherein $R^3$ and $R^4$ are alkyl or aryl, and substituted groups thereof, and each X is separately chosen from the group consisting of F and Cl, the said R being such as obtained from a dianhydride of the formula

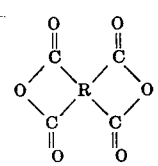

where R has the same meaning as above.

In those R radicals above having free valencies shown in indefinite positions, the free valencies are so disposed that there are two pairs of valencies, each pair being either ortho or peri.

Preferably, $R^1$ is a divalent aromatic (arylene) radical, the nitrogen atoms being attached to carbon atoms in a ring of the $R^1$ radical. Representative arylene radicals include the following and substituted derivatives thereof: phenylene, naphthylene, biphenylene, anthrylene, furylene, benzfurylene, and

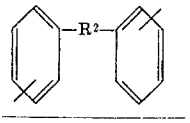

wherein $R^2$ is as defined above. The $R^1$ groups are conveniently derived from organic diamines having the formula $H_2N-R^1-NH_2$ where $R^1$ is as defined above.

Suitable polyimides for the laminar structure of the present invention include such as are derived from the following dianhydrides:

pyromellitic dianhydride
benzene-1,2,3,4-tetracarboxylic dianhydride
2,2',3,3'-diphenyltetracarboxylic dianhydride
3,3',4,4'-diphenyltetracarboxylic dianhydride
bis(2,3-dicarboxyphenyl)methane dianhydride
bis(3,4-dicarboxyphenyl)methane dianhydride
1,1-bis(2,3-dicarboxyphenyl)ethane dianhydride
1,1-bis(3,4-dicarboxyphenyl)ethane dianhydride
2,2-bis(2,3-dicarboxyphenyl)propane dianhydride
2,2-bis(3,4-dicarboxyphenyl)propane dianhydride
2,2-bis(3,4-dicarboxyphenyl)-1,1,1-trifluoroethane dianhydride
2,2-bis(3,4-dicarboxyphenyl)hexafluoropropane dianhydride
2,2-bis(3,4-dicarboxyphenyl)-1-chloro-1,1,3,3,3-pentafluoropropane dianhydride
2,2-bis(3,4-dicarboxyphenyl)-1,3-dichloro-1,1,3,3-tetrafluoropropane dianhydride
2,2-bis(3,4-dicarboxyphenyl)-1,1,3,3-tetrachloro-1,3-difluoropropane dianhydride
bis(3,4-dicarboxyphenyl) ether dianhydride
bis(3,4-dicarboxyphenyl)sulfide dianhydride
bis(3,4-dicarboxyphenyl) sulfoxide dianhydride
bis(3,4-dicarboxyphenyl) sulfone dianhydride
2,3,2',3'-benzophenonetetracarboxylic dianhydride
3,4,3',4'-benzophenonetetracarboxylic dianhydride
benzoylpyromellitic dianhydride
6-(3',4'-dicarboxybenzoyl)-2,3-naphthalene dicarboxylic dianhydride
4'-(3'',4''-dicarboxybenzoyl)-3,4-diphenyl dicarboxylic dianhydride
4-(3',4'-dicarboxybenzoyloxy)phthalic dianhydride
4-(3',4'-dicarboxybenzamido)phthalic dianhydride
3,4,3',4'-azobenzenetetracarboxylic dianhydride
naphthalene-2,3,6,7-tetracarboxylic dianhydride
naphthalene-1,4,5,8-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
3,4,9,10-perylenetetracarboxylic dianhydride
thiophene-2,3,4,5-tetracarboxylic dianhydride
pyrazine-2,3,5,6-tetracarboxylic dianhydride
ethane-1,1,2,2-tetracarboxylic dianhydride;
butane-1,2,3,4-tetracarboxylic dianhydride
cyclobutane-1,2,3,4-tetracarboxylic dianhydride
dimethylcyclobutane-1,2,3,4-tetracarboxylic dianhydride
tetramethylcyclobutane-1,2,3,4-tetracarboxylic dianhydride
cyclopetane-1,2,3,4-tetracarboxylic dianhydride
cyclohexane-1,2,4,5-tetracarboxylic dianhydride
decahydronaphthalene-1,4,5,8-tetracarboxylic dianhydride
tricyclo[4,2,2,0$^{2,5}$]dec-7-ene-3,4,9,10-tetracarboxylic dianhydride
position isomers of the above, etc., and mixtures thereof.

Suitable polyimides for the laminar structure of the present invention also include such as are derived from the following diamines:

meta-phenylenediamine
para-phenylenediamine
benzidine
3,3'-dimethyl-4,4'-diaminobiphenyl
3,3'-dichlorobenzidine
3,3'-dimethoxybenzidine
4,4'-diaminodiphenylmethane
1,1-bis(4-aminophenyl)ethane
2,2-bis(4-aminophenyl)propane
2,2-bis(4-aminophenyl)hexafluoropropane
2,2-bis(4-aminophenyl)-1,3-dichloro-1,1,3,3-tetrafluoropropane
4,4'-diaminodiphenyl ether
4,4'-diaminodiphenyl sulfide
3,3'-diamino diphenyl sulfide
4,4'-diaminodiphenyl sulfoxide
4,4'-diaminodiphenyl sulfone
3,3'-diaminodiphenyl sulfone
3,3'-diaminobenzophenone
4,4'-diaminobenzophenone
3,4'-diaminobenzophenone
N,N-bis(4-aminophenyl)aniline
N,N-bis(4-aminophenyl)methylamine
N,N-bis(4-aminophenyl)-n-butylamine
N,N-bis(4-aminophenyl)amine
m-aminobenzoyl-p-aminoanilide
4-aminophenyl 3-aminobenzoate
4,4'-diaminoazobenzene
3,3'-diaminoazobenzene
bis(3-aminophenyl)diethyl silane
bis-(4-aminophenyl)phenyl phosphine oxide
bis-(4-aminophenyl)ethyl phosphine oxide
1,5-diaminophthalene
2,6-diaminopyridine
2,5-diamino-1,3,4-oxadiazole
m-xylylenediamine
p-xylylenediamine
2,4-bis(beta-amino-t-butyl)toluene
bis(p-beta-amino-t-butylphenyl)ether
p-bis-2-(2-methyl-4-aminopentyl)benzene
p-bis(1,1-dimethyl-5-aminopentyl)benzene
hexamethylenediamine
heptamethylenediamine
octamethylenediamine
nonamethylenediamine
decamethylenediamine
2,11-diaminododecane
1,12-diaminooctadecane
2,2-dimethylpropylenediamine
2,5-dimethylhexamethylenediamine
3-methylheptamethylenediamine
2,5-dimethylheptamethylenediamine
4,4-dimethylheptamethylenediamine
5-methynonamethylenediamine
1,4-diaminocyclohexane
bis(para-aminocyclohexyl)methane
3-methoxyhexamethylenediamine
1,2-bis-(3-aminopropoxy)ethane bis(3-aminopropyl)sulfide
N,N-bis(3-aminopropyl)methylamine
position isomers of the above, etc., and mixtures thereof.

The polyimide layer of the laminar structure of the present invention may optionally consist of a layer of polyimide polymeric material described above having a layer or coating on at least one surface thereof of a fusible polyimide. The fusible polyimide component is a heat-sealable polyimide of a much smaller class of polyimides, and is characterized by the following recurring structural unit:

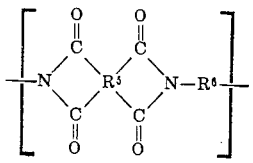

where $R^5$ is

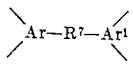

where Ar is phenylene, $Ar^1$ is phenylene, biphenylene or naphthalene, and $R^7$ is $-O-$, $-S-$, $-\overset{O}{\underset{O}{S}}-$, $-\overset{O}{C}-$, $-\overset{O}{C}-O-$, $-\overset{O}{C}-\overset{H}{N}-$, $-\overset{CFX_2}{\underset{CFX_2}{C}}-$, $-\overset{CF_3}{CH}-$, $-\overset{O}{S}-$ or alkylene of one through three carbons, where each X is separately chosen from the group consisting of F and Cl; and $R^6$ is alkylene of seven through 10 carbons, meta-phenylene, or the following:

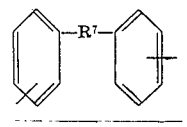

where $R^7$ has the same meaning as above.

In the recurring unit shown by formula (2) above, each carbonyl group is attached to a separate carbon atom of the aromatic radical of $R^5$, the carbonyl groups on each ring being ortho to each other.

Illustrative of fusible polyimides useful as the second component of the polyimide layer are those derived from the following dianhydrides:

2,3,2',3'-benzophenonetetracarboxylic dianhydride
3,4,3',4'-benzophenonetetracarboxylic dianhydride
benzoylpyromellitic dianhydride
6-(3',4'-dicarboxybenzoyl)-2,3-naphthalene dicarboxylic dianhydride
4'-(3'',4''-dicarboxybenzoyl)-3,4-diphenyl dicarboxylic dianhydride
4'(3',4'-dicarboxybenzoyloxy)phthalic dianhydride
4-(3',4'-dicarboxybenzamido)phthalic dianhydride
bis(3,4-dicarboxyphenyl) ether dianhydride
bis(3,4-dicarboxyphenyl) sulfide dianhydride
bis(3,4-dicarboxyphenyl) sulfone dianhydride
bis(2,3-dicarboxyphenyl)methane dianhydride
bis(3,4-dicarboxyphenyl)methane dianhydride
1,1-bis(2,3-dicarboxyphenyl)ethane dianhydride
1,1-bis(3,4-dicarboxyphenyl)ethane dianhydride
2,2-bis(2,3-dicarboxyphenyl)propane dianhydride
2,2-bis(3,4-dicarboxyphenyl)propane dianhydride
2,2-bis(3,4-dicarboxyphenyl)-1,1,1-trifluoroethane dianhydride
2,2-bis(3,4-dicarboxyphenyl)hexafluoropropane dianhydride
2,2-bis(3,4-dicarboxyphenyl)-1-chloro-1,1,3,3,3-pentafluoropropane dianhydride
2,2-bis(3,4-dicarboxyphenyl)-1,3-dichloro-1,1,3,3-tetrafluoropropane dianhydride
2,2-bis(3,4-dicarboxyphenyl)-1,1,3,3-tetrachloro-1,3-difluoropropane dianhydride and position isomers of the above.

Further illustrative of fusible polyimides useful as the second component of the polyimide layer are those derived from the following diamines:

heptamethylenediamine
3,3-dimethylpentamethylenediamine
3-methylhexamethylenediamine
3-methylheptamethylenediamine
2,5-dimethylhexamethylenediamine
octamethylenediamine
nonamethylenediamine
1,1,6,6-tetramethylhexamethylenediamine
2,2,5,5-tetramethylhexamethylenediamine
4,4-dimethylheptamethylenediamine
decamethylenediamine
meta-phenylenediamine
4,4'-diaminobenzophenone
4-aminophenyl-3-aminobenzoate
m-aminobenzoyl-p-aminoanilide
bis(4-aminophenyl)ether
bis(4-aminophenyl)methane
1,1-bis(4-aminophenyl)ethane
2,2-bis(4-aminophenyl)propane
4,4'-diaminodiphenyl sulfoxide
3,3'-diaminobenzophenone
2,2'-diaminobenzophenone
2,2-bis(4-aminophenyl)hexafluoropropane
2,2-bis(4-aminophenyl)-1,3-dichloro-1,1,3,3-tetrafluoropropane
N,N-bis(4-aminophenyl)amine.

It is preferred that the fusible polyimide that forms the second component of the polyimide layer of the laminar structures of the present invention be a heat-sealable polyimide wherein $R^5$ is

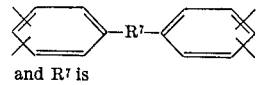

and $R^7$ is

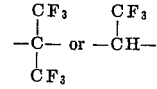

The fusible polyimide that forms the second component of the polyimide layer of the laminar structures of the present invention may vary in thickness from between about 0.01 mil and about 2 mils.

The polyimides and polyamide-acids are more fully described in patents such as U.S. Pat. No. 3,179,614 and U.S. Pat. No. 3,179,634. The thickness of the polyimide layer is between about 0.25 mil and about 10 mils, preferably between 0.5 and 2.0 mils.

The laminar structure of the invention is further characterized by a layer of a fluorocarbon polymeric material. The expressions "fluorocarbon polymer" and "fluorocarbon polymeric material" as used herein means polytetrafluoroethylene (TFE) and copolymers of tetrafluoroethylene and hexafluoropropylene (FEP). The fluorocarbon polymers are extensively described in such patents as U.S. Pat. Nos. 2,833,686; 2,946,763 and 3,051,683. The layer of fluorocarbon polymer is preferably a copolymer of between about 50 percent by weight and about 95 percent by weight tetrafluoroethylene and between about 5 percent by weight and about 50 percent by weight of hexafluoropropylene, especially wherein the amount of hexafluoropropylene is between about 7 percent by weight and about 27 percent by weight. All percentages are by weight based upon the total copolymer weight. Optionally, the fluorocarbon copolymer may be blended with up to 95 percent by weight (of the total weight of the two polymers) of a homopolymer of tetrafluoroethylene. The thickness of the fluorocarbon polymer layer is preferably between about 0.25 mil and about 10 mils.

A salient feature of the present invention resides in the manner whereby the polyimide layer and the fluorocarbon polymer layer are united to provide a unitary laminar structure. This is accomplished by laminating at a temperature in the range of 240° C. to 280° C. at a pressure in excess of about 10 pounds per square inch for a time of at least 0.01 second a base layer of a polyimide film having a moisture content below about 1 percent and preferably below about 0.5 percent by weight, to a film of a fluorocarbon polymer that has been subjected to electrical discharge treatment in an atmosphere containing acetone. The laminate may subsequently be optionally heated to a temperature in the range of 350° to 500° C. for at least 1 second.

The laminating step of the process of the present invention may be conducted by advancing the polyimide film and the specially treated fluorocarbon polymer film into a nip under pressure on a hot drum. The resulting laminar structure can then be wound directly into roll form. When it is desired to make a polyimide film having a fluorocarbon polymer film adhered to both surfaces thereof, then either two passes are made through the equipment above described, or by bringing all three layers of the ultimate laminar structure into the nip simultaneously. The above films are preferably directed into the nip at a temperature of between about 250° C. and about 270° C. at a pressure of between about 40 and about 500 pounds per square inch for a time in excess of about 0.02 second. If the optional second step of the process is used, it is preferred that the laminar structure be heated to a temperature in the range of between about 400° C. and about 475° C. for a time in excess of about 5 seconds; the heating may be accomplished by any convenient means such as, for example, utilizing radiant heaters, hot air or the like.

By "specially treated fluorocarbon polymer film" is meant a film prepared by a process which comprises exposing the surface of a fluorocarbon polymer film to the action of an electrical discharge at substantially atmospheric pressure between spaced electrodes, said electrical discharge having an average energy level below 15 electron volts, in an atmosphere containing from less than about 5 percent by volume to greater than 40 percent by volume of the vapor of acetone in a gaseous carrier medium which will sustain the electrical discharge.

Using apparatus more fully described in U.S. Pat. No. 3,296,011, a continuous self-supporting film of fluorocarbon polymeric material is preferably continuously passed between a set of spaced electrodes consisting of a rotating metal roll which is coated with a glass dielectric and is connected electrically to ground, and one or more stationary hollow metallic or nonmetallic tubes disposed parallel to the longitudinal axis of the roll and spaced a distance of from 0.03 to 0.125 inch from the surface thereof. The tubes are each connected electrically to a suitable power source which supplies to each tube electrode an alternating (or pulsating direct) current of from 0.1 to 5.5 RMS (root mean square) amperes at a voltage in the range of 5,000 to 30,000 volts with pulsating peak voltages up to 100,000 volts, and at a frequency in the range of from 300,000 to 500,000 cycles per second. A mixture of inert gas, i.e., a gas substantially free of oxygen gas, e.g., nitrogen, and vapors of acetone is continuously fed to the hollow interior of the electrode tubes through distributor ducts and issues from the tubes at the gap between each tube and the roll through suitable openings along the length of the tubes, whereby the electrical discharge between the electrodes takes place in a nonoxidizing atmosphere containing the acetone vapors. The vapors may also be introduced into the reaction zone through one or more tubes separate from the electrode assembly. The assembly just described is suitably enclosed in a chamber held at atmospheric pressure and provided with the necessary openings, to facilitate maintenance of an oxygen gas-free atmosphere in the treating zone, and controlled exhaust of the mixture of nitrogen and acetone vapors therefrom, and to minimize operational hazards.

It should be understood that the fluorocarbon polymer film can be treated at normal room temperatures or at elevated temperatures. The treatment at the higher temperature may be realized by an in-line process wherein the fluorocarbon polymer film extruded at high temperature is fed directly into the electric discharge treating apparatus before the film is cooled to room temperature.

It is essential that the electrical discharge treatment with acetone vapor in a suitable gaseous carrier take place in an atmosphere containing no more than 200 p.p.m. oxygen, preferably not more than 50 p.p.m.

In the practice of the process, the potential difference between the electrodes can vary from very low voltages on the order of 1,000 volts up to pulsating peak voltages of 100,000 and above. In general, voltages in excess of 2,000–3,000 are desired to bring about effective treatment of the film surface. Frequencies from 350 cycles per second up to 500,000 cycles per second or higher can be used and frequencies in the range of 300,000 to 500,000 cycles are preferred for rapid and effective treatment.

In general, the effectiveness of the treatment increases with the power supplied to the electrodes for a given area of electrode and time of exposure. Current to the electrodes can range up to 5.5 RMS (root mean square) amperes or higher. However, it is preferred to operate in the range of 0.1 RMS amperes to 3.5 RMS amperes to give reasonable treating times on the one hand, and to avoid rapid degradation of the electrodes at too high currents on the other hand. Power to the high-frequency generator can range from 10 to 1,800 watts per lineal inch of the electrode length. The electrical discharge employed, operating within the parameters above specified, has an average energy level below 15 electron volts, and is not to be confused with the high or intermediate energy irradiations commonly used to treat polymeric surfaces.

The time of exposure of the fluorocarbon polymer film to the electric discharge treatment is not especially critical and effective treatments are realized at exposure times as low as one second or less and no adverse effects are noted at times as long as 60 seconds. Longer exposure times can probably also be employed although for economic reasons exposure times as short as possible, consistent with effective treatment, would normally be employed.

Preferably, the electrodes are spaced from between about 0.03 inch and about 0.125 inch apart. However, useful results can be obtained when the electrodes gap is as low as 0.015 inch and as much as 0.25 inch provided suitable adjustments in such features as amount of current, electrode dimension and exposure time are made.

As noted previously, the presence of acetone vapor in the space between the electrodes is a vital requirement in the treatment process. The acetone vapor is employed as a solution in a suitable carrier gas; the concentration of the acetone vapor in the carrier gas can range from 5 percent or less by volume up to 40 percent or more by volume. The carrier gas should have characteristics such that it does not interfere with the maintenance of a continuous electrical discharge between the electrodes. Some gases with too low a breakdown potential may permit excessive arcing across the electrodes; those with too high dielectric strength tend to repress the electrical discharge. Particularly suitable carrier gases are nitrogen or carbon dioxide. Such gases as hydrogen or helium are also operable. Satisfactory results have been obtained by bubbling nitrogen through acetone liquid at a rate of 240 cubic feet per hour and acceptable results were obtained at a gaseous flow rate as low as 10 cubic feet per hour. No adverse effects have been observed in the use of higher flow rates, though again, economic considerations would dictate against use of amounts exceeding those required to produce the desired effect.

Suitable treatment of fluorocarbon polymer film has been obtained by advancing at a speed of about 17 feet per minute a film having a width of 25 inches and a thickness of 0.5 mil between two electrodes spaced 40 mils apart and simultaneously directing a mixture of 30 volume percent acetone vapor and 70 volume percent nitrogen onto one side of the film at a rate of 12 cubic feet per minute while maintaining a power setting of 4.4 on a model number HFSG-2 Lepel generator unit connected to the electrodes. Power settings of 4 and 6 on the Lepel generator and concentrations of acetone as low as 5 volume percent also were found to be satisfactory for treating fluorocarbon polymer film.

As mentioned above, it is critical that the polyimide film have a moisture content of no greater than about 1 percent by weight when brought into the nip with the treated fluorocarbon polymer film. Otherwise an intolerable amount of bubbles are formed in the laminate during the laminating operation. It is preferred that the moisture content of the polyimide film be below about 0.5 percent by weight. Excessive moisture present can be removed by preheating or drying the polyimide film at about 400° C. before the films to be laminated are brought into the nip.

Laminar structures of the present invention of a polyimide film having laminated thereto on either one or both sides a fluorocarbon polymer film are useful in applications where a heat-sealable film stable at high temperatures is desirable. Such laminar structures perform with high reliability under extreme conditions and temperatures. The laminar structures are especially useful in electrical applications where heat-sealability is desired such as in insulation for various types of wire, cable and flat cable, and strap insulation for motors and motor armatures; they also are useful for motor slot liners, insulation for motor protectors and fuses, and as capacitor dielectric and backing for printed circuits. The laminar structures of the invention also are useful in nonelectrical applications where heat-sealability is desired such as spiral wrapped tubing for heat exchangers, and various types of valves, gaskets, seals and belts.

The particular advantage of the improved product of this invention over similar laminates known heretofore is that it retains a significantly higher amount of the initial intralaminar adhesive strength and heat-seal strength, upon exposure to elevated temperatures for long periods of time.

When fluorocarbon polymer film which has been treated on both sides with acetone in an electrical discharge is used to make the product of this invention, any exposed fluorocarbon polymer surface of the product is wettable and thus can readily be printed or marked with inks. Furthermore, it is of advantage to use fluorocarbon polymer film treated with acetone rather than other organic compounds, since films treated on both sides with acetone in an electrical discharge do not block in roll form, while films treated with other organic compounds in an electrical discharge block to such degree that the film cannot be unwound from the roll.

A laminar structure according to the present invention wherein a polyimide film has laminated thereto a fluorocarbon film on both sides is heat-sealable as such. A laminar structure of polyimide and only one fluorocarbon film layer does not readily form heat-seals when the polyimide surface of the laminate is placed against the fluorocarbon polymer surface of the laminate. If the exposed surface of the fluorocarbon layer has, however, been treated with acetone vapor in an electrical discharge (either before the laminate has been made by using two-side treated fluorocarbon polymer film, or after the laminate has been made by treating the exposed surface), the polyimide surface readily heat-seals to the exposed fluorocarbon polymer surface and such laminar structure is a preferred embodiment of this invention.

Another salient feature of the present invention is that wherein the laminar structures described above can be adhered on the exposed fluorocarbon polymer surface thereof to a metal foil such as aluminum or copper. Superior fluorocarbon polymer/metal bonds are obtained if the fluorocarbon polymer surface to be adhered to the metal foil has been treated with acetone vapor in an electrical discharge.

More specifically, two layer laminar structures of the present invention, e.g., polyimide/perfluorocarbon laminates and also three layer laminar structures of the present invention, e.g., perfluorocarbon/polyimide/perfluorocarbon laminates, as well as laminates of a larger number of layers, are useful for further laminates with other materials, in particular, metals such as aluminum.

For example, a polyimide/perfluorocarbon polymer laminar structure may be treated on the exposed fluorocarbon surface by electrical discharge as described above, and then the treated surface brought into contact with a thin aluminum sheet of between about 1 mil and about 10 mils thickness at a temperature in excess of about 230° C., under a pressure in excess of about 10 pounds per square inch. This polyimide/fluorocarbon/aluminum composite is useful as a shield for electrical conductors. It replaces both woven wire mesh shield and exterior insulation. In the composite, the principal purpose of the aluminum layer is an electrical conductor. The polyimide serves as a strengthening member, especially at high temperatures, and as a support for the weaker aluminum layer, and the perfluorocarbon serves to bond the two layers together. The aluminum layer provides a shield against external electromagnetic fields, thus excluding any external interference and crosstalk between conductors. The aluminum picks up and drains any external electrical fields. The aluminum shield may, as desired, either be grounded, or be used as part of the electrical circuit (that is, "driven") or not, as required in different applications.

By way of further example, a fluorocarbon/polyimide/fluorocarbon three-layer laminar structure can be surface treated on one side with acetone vapor in an electrical discharge as described above, and then the treated surface brought into contact with a thin aluminum sheet. This gives a fluorocarbon/polyimide/fluorocarbon/aluminum four-layer laminar structure which is useful as a combination electrical insulation and shield.

By way of further example, a fluorocarbon/polyimide/fluorocarbon three-layer laminar structure can be surface treated on one side with acetone vapor in an electrical discharge as described above, and then the treated surface brought into contact with a thin aluminum sheet while simultaneously laminating to the other side of the aluminum a film of fluorocarbon polymer which also has one treated surface. In all cases the treated surface of the fluorocarbon polymer is brought into contact with the aluminum. This gives a fluorocarbon/polyimide/fluorocarbon/aluminum/fluorocarbon five-layer laminar structure which is useful in making duct or tubing for carrying various gases or liquids, as this is a heat-sealable composite. It is useful for the fabrication of spiral wrapped duct or tube and especially useful for the fabrication of double-layer, crossed-spiral duct or tubing, that is, where the two spirals are right- and left-hand spirals.

A duct constructed of the five-layer laminar structure is especially useful in the compressors of air-conditioning systems, for conveying chlorinated and fluorinated hydrocarbons and other compressible fluids used in such systems. It is also useful for conveying the hot exhaust gases from various types of internal combustion engines. It is further useful as a chafing sleeve for various types of hose and tubing, to replace metal braid which is normally used in such applications.

In another five-layer embodiment, the layers in turn are metal/fluorocarbon/polyimide/fluorocarbon/metal. This product is particularly effective in providing shielding of primary conductors.

In the aluminum composites described above the aluminum sheet can be as thin as ¼ mil or less and up to about 10 mils.

Thick laminar structures useful as spacers, etc., can be built up by combining a plurality of thinner laminar structures. Thus, insulator sections 5 mils in thickness can be built-up in one pass from two 2-mil thick polyimide films, with an intermediate two side-treated 1-mil-thick fluorocarbon polymer film. Thicker laminar sections can be built-up by using thicker component films, or by adding additional fluorocarbon polymer and polyimide film layers. Many of the products within the scope of the present invention are heat-sealable, thermally stable laminates. The process of the present invention employs no adhesive, and thus offers savings in material and processing cost and eliminates certain product deficiencies associated with the presence of an adhesive or adhesion promotor. The combination of a chemically inert film, such as fluorocarbon polymer, with a highly thermally stable film, such as polyimide, offers useful and unique features.

The principle and practice of the present invention will now be illustrated by the following examples which are provided to show the practice and use thereof.

The test samples of the laminar structures prepared in the following examples were evaluated in accordance with the following testing procedure:

HEAT SEAL STRENGTH is measured by cutting a piece of the laminar film test sample of 4 inches by 10 inches, with the grain of the film running in the short or transverse direction, into two pieces each of 4 inches by 5 inches. The two test pieces are placed in superposed relation so that opposing fluoropolymer surfaces thereof are in contact. The superimposed films are then sealed together at each end parallel to the grain of the film by means of a three-fourths inch wide sealing bar that is heated to a temperature of 350° C. and contacts the film ends at 20 p.s.i. pressure for 30 seconds. The sealed test samples are then cut in half parallel to the grain of the film, and the two resulting pieces are each cut along their centerline at right angles to the grain of the film to provide 1 inch wide strips. The resulting four sets of strips are tested for heat seal strength by securing the free ends thereof in a Suter testing machine and pulling the test samples apart. The first one-eighth inch and last one-eighth inch of the sealed area are separated before placing the test specimen in the Suter tester. This is done because a small bead of fluorocarbon polymer resin forms at each end of the sealed area during sealing, and gives a higher seal value not representative of the major area of the seal. The highest force in grams required to pull the strips apart is taken as a measure of the heat seal bond strength.

Fluorocarbon polymer films that are a copolymer of tetrafluoroethylene and hexafluoropropylene are abbreviated FEP in the following examples.

EXAMPLE 1

A 1-mil film of the polypyromellitimide of bis(4-aminophenyl)ether was laminated to two 0.5-mil films of a fluorocarbon polymer (copolymer of 85 percent by weight tetrafluoroethylene and 15 percent by weight hexafluoropropylene; coded FEP) which had been treated on one side with acetone vapor in an electrical discharge, separately in two passes, by advancing the films into a nip formed between a drum (heated at 250°–270° C.) and a press roll at a nip pressure of about 40 p.s.i. The treated side of each FEP film contacted the surface of the intermediate polyimide film. The operations were carried out with continuous rolls of film at a speed of 50 feet per minute.

The laminar structure so made was tested by heat-sealing samples together front side to back side, at 350° C. under 20 p.s.i. for 30 seconds. Heat seals were tested immediately. Further sealed samples were aged in air in ovens held at various constant temperatures and samples were periodically removed at selected intervals for testing the heat seal values.

The laminar structure was compared against a control laminar structure similarly constituted, but wherein the FEP films were treated with glycidyl methacrylate in an electrical discharge, and the polyimide film was primed on both sides with a dilute solution of polyethyleneimine and dried before the three films were laminated. The test results are shown in table I below. In table I, zero days of aging refers to the initial heat seal values of the test samples.

EXAMPLE 2

The procedure of example 1 was repeated using polyimide film of 2 mils thickness, and the laminating operation was carried out at 40 feet per minute. The heat seal test results for this laminar structure are given in table 1 below, along with the results for a similarly constituted control laminar structure that had been prepared by the procedure described in example 1.

EXAMPLE 3

A 1-mil film of the polypyromellitimide of bis(4-aminophenyl)ether was laminated to a 0.5-mil film of FEP polymer which had been treated on both sides with acetone vapor in an electrical discharge, by combining the two films in a nip between a drum (heated at 250°–270° C.) and a press roll at a nip pressure of about 40 p.s.i. The operation was carried out with continuous rolls of film at a speed of 50 feet per minute.

The laminar structure thus prepared was tested by heat-sealing samples (front side to back side, i.e., treated FEP polymer against polyimide) at 350° C. under 20 p.s.i. for 30 seconds.

A control laminar structure similarly constituted except that the FEP film was treated on both sides with glycidyl methacrylate in an electrical discharge, and the polyimide film was primed on both sides with a dilute solution of polyethyleneimine and dried before the two films were laminated was also prepared and tested. The test results for both laminar structures are given in table I below.

TABLE I.—HEAT-SEAL VALUES OF AGED FILMS IN GRAMS/INCH

| Aging temp. (° C.) | Aging (days) | Example 1 | Control | Example 2 | Control | Example 3 | Control |
|---|---|---|---|---|---|---|---|
| 150 | 0 | 1,680 | 2,080 | 2,280 | 2,130 | 1,120 | 1,340 |
|  | 7 | 1,480 | 1,530 | 1,790 | 990 | 990 | 180 |
|  | 16 | 1,460 | 1,020 | 2,080 | 1,290 | 1,070 | 690 |
|  | 30 | 1,440 | 870 | 2,010 | 770 | 940 | 540 |
|  | 50 | 1,350 | 650 | 1,840 | 550 | 1,100 | 270 |
|  | 65 | 1,390 | 520 | 2,830 | 390 | 1,090 | 140 |
|  | 85 | 1,290 | 530 | 1,660 | 280 | 780 | 170 |
|  | 100 | 1,440 | 420 | 1,730 | 13 | 960 | 150 |
|  | 135 | 1,350 | 300 | 2,210 | 0 | 1,040 | 0 |
| 175 | 0 | 1,460 | 1,720 | 2,080 | 2,370 | 1,350 | 1,420 |
|  | 5 | 1,480 | 640 | 2,020 | 1,500 | 1,150 | 900 |
|  | 15 | 1,330 | 350 | 1,740 | 660 | 1,030 | 230 |
|  | 27 | 1,190 | 110 | 1,490 | 90 | 880 | 100 |
|  | 41 | 1,140 | 40 | 2,100 | 0 | 1,080 | 20 |
|  | 55 | 1,120 | 0 | 1,470 | 0 | 810 | 0 |
|  | 70 | 1,030 | 0 | 1,480 | 0 | 870 | 0 |
|  | 90 | 990 | 0 | 1,380 | 0 | 1,130 | 0 |
|  | 111 | 940 | 0 | 1,600 | 0 | 680 | 0 |
|  | 140 | 900 | 0 | 1,350 | 0 | 650 | 0 |
| 200 | 0 | 1,510 | 1,960 | 2,230 | 3,060 | 1,160 | 1,260 |
|  | 3 | 1,580 | 760 | 2,000 | 650 | 1,400 | 740 |
|  | 7 | 1,080 | 170 | 1,780 | 190 | 1,110 | 140 |
|  | 10 | 1,310 | 70 | 1,730 | 30 | 980 | 30 |
|  | 15 | 1,130 | 0 | 1,470 | 0 | 850 | 0 |
|  | 21 | 1,190 | 0 | 1,330 | 0 | 870 | 0 |
|  | 30 | 740 | 0 | 1,080 | 0 | 760 | 0 |
|  | 35 | 950 | 0 | 1,060 | 0 | 660 | 0 |
|  | 50 | 760 | 0 | 1,120 | 0 | 550 | 0 |
|  | 65 | 640 | 0 | 790 | 0 | 480 | 0 |
|  | 80 | 580 | 0 | 460 | 0 | 400 | 0 |
|  | 100 | 320 | 0 | 380 | 0 | 80 | 0 |
| 225 | 0 | 1,700 | 1,530 | 3,330 | 2,770 | 1,230 | 1,090 |
|  | 1 | 1,500 | 800 | 1,920 | 1,170 | 1,290 | 700 |
|  | 2 | 1,070 | 610 | 1,990 | 820 | 1,180 | 260 |
|  | 3 | 1,060 | 210 | 1,390 | 260 | 1,010 | 240 |
|  | 4 | 1,220 | 300 | 1,640 | 0 | 1,050 | 160 |
|  | 7 | 810 | 190 | 1,060 | 0 | 830 | 50 |
|  | 9 | 1,010 | 0 | 1,190 | 0 | 740 | 0 |
|  | 15 | 390 | 0 | 600 | 0 | 400 | 0 |
|  | 21 | 270 | 0 | 230 | 0 | 170 | 0 |
| 250 | 0 | 1,530 | 2,080 | 2,060 | 2,450 | 1,290 | 1,450 |
|  | 1 | 1,090 | 1,020 | 1,400 | 630 | 1,210 | 970 |
|  | 2 | 1,040 | 670 | 1,640 | 290 | 940 | 740 |
|  | 4 | 930 | 470 | 1,020 | 200 | 950 | 510 |
|  | 7 | 690 | 280 | 700 | 0 | 660 | 350 |
|  | 10 | 240 | 0 | 410 | 0 | 280 | 190 |

EXAMPLE 4

The laminar structures prepared in examples 1 and 3, and the corresponding control films of those examples were slit into tapes of one-fourth inch width.

Number 20 (American Wire Gauge) silver-coated copper conductor was (a) first wrapped with a spiral winding of the tape of example 3, with 50 percent overlap, such that the exposed polyimide surface of the tape contacted the conductor, (b) then wrapped with a second spiral winding of the tape of example 1, with 50 percent overlap, and (c) the resulting double wrapped wire was passed through an oven heated at 480° C. The wrapping operation was carried out on a tape-wrapping machine at 10 feet per minute.

A similarly constituted wire for comparison as a control was prepared in the manner described in the preceding paragraph using the control tape of example 3 for the first wrap and the control tape of example 1 for the second wrap.

The insulated wires were examined immediately with respect to the ease or difficulty of peeling the insulation from the conductor. Wire samples also were aged in air in ovens held at various constant temperatures, and samples were periodically removed at selected intervals for testing the peel performance. The rating scale is as follows:

4 — cannot peel
3 — very difficult to peel
2 — moderate peel resistance
1 — low peel resistance
0 — no peel resistance The results are given in table II below.

EXAMPLE 5

The film of example 3 and its control were slit into tapes of one-quarter inch width. The film of example 2 and its control were slit into tapes of five-sixteenths inch width.

An insulated conductor was prepared in the manner described in example 4, using a first wrap of example 3 tape and a second wrap of example 2 tape.

A similarly constituted control insulated conductor also was prepared as described in example 4, using a first wrap of example 3 control tape and a second wrap of example 2 control tape.

The results are given in table II below.

TABLE II

Peel Resistance Ratings for Insulated Wires

| Aging Temp. °C. | Aging Days | Example 4 | Control | Example 5 | Control |
|---|---|---|---|---|---|
| 175 | 0 | 2½ | 2 | 4 | 3½ |
| | 5 | 2 | 2 | 4 | 3½ |
| | 14 | 2 | 2 | 4 | 3 |
| | 27 | 1½ | 1½ | 4 | ½ |
| | 42 | 2 | 1 | 4 | 0 |
| | 54 | 2 | ½ | 4 | 0 |
| | 148 | 1½ | 0 | 4 | 0 |
| 200 | 0 | 2½ | 2 | 4 | 3½ |
| | 3 | 1½ | 1½ | 4 | 3 |
| | 7 | 2 | 1 | 4 | 1 |
| | 10 | 2 | ½ | 4 | 0 |
| | 14 | 2 | 0 | 4 | 0 |
| | 20 | 2 | 0 | 4 | 0 |
| | 35 | 2 | 0 | 4 | 0 |
| | 50 | 2 | 0 | 3½ | 0 |
| | 142 | 2 | 0 | 2 | 0 |
| 225 | 0 | 2½ | 2 | 4 | 3½ |
| | 3 | 2 | 1 | 4 | ½ |
| | 4 | 2½ | 0 | 4 | 0 |
| | 7 | 2½ | 0 | 4 | 0 |
| | 10 | 1½ | 0 | 3½ | 0 |
| | 14 | 1½ | 0 | 3½ | 0 |
| | 20 | 1 | 0 | 3 | 0 |
| | 27 | 1 | 0 | 2½ | 0 |
| 250 | 0 | 2½ | 2 | 4 | 3½ |
| | 3 | 2½ | 1½ | 4 | 1 |
| | 4 | 1½ | ½ | 4 | 0 |
| | 7 | 1½ | 0 | 3½ | 0 |
| | 10 | ½ | 0 | 3½ | 0 |
| | 14 | ½ | 0 | 2½ | 0 |

EXAMPLE 6

The procedure of example 3 was repeated with the exceptions that the polyimide film was 2 mils thick, and the laminating operation was carried out at 265°–275° C. at a speed of 40 feet per minute. The heat-seal results are given in table III, compared against a similarly constituted control film similar to the control film of example 3 except that the polyimide film was again 2 mils thick (control A), and also against a similarly constituted control wherein the polyimide layer was 1 mil thick (control B).

TABLE III

Heat-Seal Values of Aged Films in grams/inch

| Aging Temp. °C. | Aging Days | Example 6 | Control A | Control B |
|---|---|---|---|---|
| 200 | 0 | 2,250 | | 1,668 |
| | 3 | 2,113 | | 646 |
| | 7 | 1,667 | | 158 |
| | 10 | 1,485 | | 63 |
| | 15 | 1,375 | | 0 |
| | 21 | 485 | | 0 |
| | 36 | 248 | | 0 |
| 225 | 0 | 1,666 | 2,493 | 1,783 |
| | 1 | 2,055 | 982 | 798 |
| | 2 | 1,655 | 538 | 560 |
| | 3 | 1,090 | 320 | 393 |
| | 4 | 1,225 | 23 | 30 |
| | 7 | 488 | 0 | 0 |
| | 10 | 537 | 0 | 0 |
| | 15 | 255 | 0 | 0 |

EXAMPLE 7

A polyamide-acid priming solution was prepared following the procedure described in U.S. Pat. No. 3,179,614, by slowly adding 161.1 g. (0.5 mole) of 3,4,3', 4'-benzophenone-tetracarboxylic dianhydride to a solution of 100.0 g. (0.5 mole) of bis(4-aminophenyl)ether in 1,485 ml. of dry N,N-dimethylacetamide (DMAC). The resulting polyamide-acid had an inherent viscosity of 0.88, measured on a 0.5 percent by weight solution in DMAC at 30° C. Additional DMAC was added to the polyamide-acid solution to give a total volume of 16 liters. This priming solution was approximately 1.6 percent solids (wt./vol.basis).

A 200-foot roll of 1-mil film of the polypyromellitimide of bis(4-aminophenyl)ether was primed on both sides with the above priming solution, excess bath was wiped from each surface with stationary smoothing rolls, and passed through a first drying oven heated at 150° C. and a second drying oven at 240° C., at a speed of 20 feet per minute.

This primed film was then laminated separately in two passes to two 0.5-mil FEP films. One of the FEP films was treated on one side with acetone in an electrical discharge (resulting side of laminate called side A); the other FEP film was treated on one side with glycidyl methacrylate in an electrical discharge (resulting side of laminate called side B). In the laminating operation, the treated sides of the FEP films were placed against opposite sides of the coated base polyimide. The films were combined in the nip of a drum laminator with a drum temperature of 260° C. at 50 feet per minute.

Heat-sealed samples were prepared (side A to side A), and tested as described in example 1, and compared against a control sample prepared with the control film of example 1. The results are shown in table IV below.

EXAMPLE 8

A polyamide-acid solution was prepared by slowly adding 185.0 g. (0.42 mole) of 2,2-bis(3,4-dicarboxyphenyl)hexafluoropropane dianhydride to a solution of 83.4 g. (0.417 mole) of bis(4-aminophenyl) ether in 1,520 ml. of DMAC. The resulting polyamide-acid had an inherent viscosity of 0.94, measured on a 0.5 percent by weight solution in DMAC at 30° C. To this solution was added 100 ml. of acetic anhydride and 50 ml. of pyridine, and the mixture was stirred for 1 hour, in order to convert the polyamide-acid to the corresponding soluble polyimide. Additional DMAC was added to the soluble polyimide solution to give a total volume of 16 liters. This priming solution was approximately 1.6 percent solids (wt./vol.basis).

A 200-foot roll of 1-mil polyimide film was primed on both sides with this priming solution, laminated to two treated FEP films, heat-sealed and tested, all as described in example 7. The results are given in table IV below.

TABLE IV

Heat-Seal Values of Aged Films in grams/inch

| Aging Temp. °C. | Aging Days | Example 7 | Control | Example 8 |
| --- | --- | --- | --- | --- |
| 200 | 0 | 1,400 | 2,230 | 1,430 |
|  | 3 | 1,260 | 590 | 1,470 |
|  | 7 | 1,580 | 430 | 1,360 |
|  | 11 | 1,200 | 130 | 1,340 |
|  | 21 | 1,090 | 0 | 1,290 |
|  | 31 | 1,420 | 0 | 1,320 |
|  | 41 | 1,160 | 0 | 1,220 |
|  | 52 | 1,130 | 0 | 1,170 |
|  | 80 | 1,120 | 0 | 970 |
|  | 101 | 990 | 0 | 910 |
| 225 | 0 | 1,500 | 2,320 | 1,450 |
|  | 1 | 1,500 | 830 | 1,400 |
|  | 2 | 1,250 | 640 | 1,380 |
|  | 3 | 1,240 | 460 | 1,230 |
|  | 4 | 1,280 | 360 | 1,080 |
|  | 7 | 1,210 | 30 | 1,280 |
|  | 10 | 1,240 | 0 | 1,030 |
|  | 15 | 970 | 0 | 990 |
|  | 21 | 970 | 0 | 800 |
|  | 30 | 860 | 0 | 850 |
|  | 55 | 370 | 0 | 690 |

EXAMPLE 9

A polyamide-acid coating solution was prepared following the procedure described in U.S. Pat. No. 3,179,614, by slowly adding 351 g. (0.98 mole) of bis(3,4-dicarboxyphenyl)sulfone dianhydride to a solution of 200 g. (1.00 mole) of bis(4-aminophenyl)ether in 2,500 ml. of DMAC. The resulting polyamide-acid solution had an inherent viscosity of 0.81, measured on a 0.5 percent by weight solution in DMAC at 30° C. A second such batch, having an inherent viscosity of 0.73, was blended with the first batch. The solution was about 19 percent solids (wt./wt.basis).

A 450-foot roll of 1-mil film of the polypyromellitimide of bis(4-aminophenyl)ether was coated on both sides with the above coating bath by dipping the film in the bath, passing the film between doctor rolls set with a 3-mil gap, wiping with stationary smoothing rolls, and passing through a first drying oven heated at 160° C. and a second drying oven at 265° C., at a speed of 5 feet per minute. The coating thickness was measured at approximately 0.15 mil for each side of the film.

This coated film was then laminated separately in two passes to two 0.5-mil FEP films. One of the FEP films was treated on one side with acetone in an electrical discharge (resulting side of laminate called side A); the other FEP film was treated on one side with glycidyl methacrylate in an electrical discharge (resulting side of laminate called side B). In the laminating operation, the treated sides of the FEP films were placed against opposite sides of the coating base polyimide. The films were combined in the nip of a drum laminator with a drum temperature of 260° C. at 50 feet per minute.

Heat-sealed samples were prepared (side A to side A), and tested as described in example 1, compared against another sample of the control film as described in example 1. The results are shown in table V below.

EXAMPLE 10

A base gel film of polyamide-acid/imide based on pyromellitic dianhydride and 4,4'-diaminodiphenyl ether was prepared as follows: to a solution of 2,000 g. (10 moles) of 4,4'-diaminodiphenyl ether (DDE) in 23,690 g. of N,N-dimethylacetamide (DMAC) was added slowly in portions 2,180 g. (10 moles) of pyromellitic dianhydride (PMDA) while maintaining the temperature below 60° C., this procedure following the procedure described in U.S. Pat. No. 3,179,614. The resulting 15 percent solids solution of the polyamide-acid was cooled to 0° C., and while maintaining this temperature, 4,080 g. (40 moles) of acetic anhydride and 1,860 g. (20 moles) of beta-picoline were mixed in; this composition was cast onto a drum heated at 100° C. in a thickness of about 10 mils (which results in a nominal dry polyimide film thickness of 1 mil) and held there for about 10 seconds, after which it was stripped from the drum as a self-supporting gel polyamide-acid/imide film. About 100 feet of such gel film was coated in a continuous operation with a polyamide-acid coating lacquer (approx. 10.7 percent solids, wt./wt.basis) prepared from 322.2 g. (1.00 mole) of benzophenone-3,4,3',4'-tetracarboxylic dianhydride and 200.0 g. (1.00 mole) of 4,4'-diaminodiphenyl ether in 2,970 ml. of DMAC, and further diluted after reaction with 1,661 ml. of DMAC. The polymer of the coating lacquer had an inherent viscosity of 0.70, measured on a 0.5 percent by weight solution in DMAC at 30° C. The base gel film was coated at a rate of 10 to 16 inch/minute on one side only by bringing it in contact with an air-driven rotating applicator roll which dipped into a trough of the coating lacquer. After receiving the coating lacquer, the coated film was brought into contact with a fixed metering rod wrapped with No. 13 (13 mil diameter) stainless steel wire. The coated film was fixed onto a pin-type tenter frame and dried by passing through an oven having a temperature of about 200° C. at the entrance and increasing to about 400° C. at the exit, the residence time in the oven being about 5 minutes.

This coated film was then laminated separately in two passes to two 0.5-mil FEP films. One of the FEP films was treated on one side with acetone in an electrical discharge, and the treated side was placed against the coated side of the base polyimide film (side A of laminate). The other FEP film was treated on one side with glycidyl methacrylate in an electrical discharge, and the treated side was placed against the uncoated side of the base polyimide film (side B of laminate). The films were laminated in a drum laminator with a drum temperature of 260° C. at 50 feet per minute. Side B was laminated first, then side A.

Heat-sealed samples were prepared, side A against side A, and tested as described in example 1, and compared against another sample of the control film as described in example 1. The results are shown in table V below.

EXAMPLE 11

Example 10 was repeated, with the single exception that a different polyamide-acid was used in coating the base film. In this case the polyamide-acid coating lacquer (approx. 10.7 percent solids, wt./wt.basis) was prepared from 37.0 grams (0.833 mole) of 2,2-bis(3,4-dicarboxyphenyl)hexafluoropropane dianhydride and 166.7 g. (0.833 mole) of bis(4-aminophenyl) ether in 3,040 ml. of DMAC, and further diluted after reaction with 1,700 ml. of DMAC. This polymer had an inherent viscosity of 1.16, measured on a 0.5 percent by weight solution in DMAC at 30° C. The results of this example are also shown in table V below.

EXAMPLE 12

Example 10 was repeated, using a different polyamide-acid to coat the base film. In this case, a 15 percent solids polyamide-acid coating lacquer was prepared from 351.00 g. (0.9797 mole) of bis(3,4-dicarboxyphenyl) sulfone dianhydride and 200.00 g. (0.9988 mole) of 4,4'-diaminodiphenyl ether in 3,162 ml. of DMAC. It had an inherent viscosity of 0.63, measured on a 0.5 percent by weight solution in DMAC at 30° C. A duplicate preparation had an inherent viscosity of 0.60. The two batches were combined for use in a single coating run. The results of this example are shown in table V below.

TABLE V

Heat-Seal Values in Grams/Inch of Films Aged at 200° C.

| Aging Days | Example 9 | Example 10 | Example 11 | Example 12 | Control |
|---|---|---|---|---|---|
| 0 | 1,857 | 2,178 | 1,735 | 1,322 | 2,208 |
| 3 | 1,560 | 1,950 | 1,792 | 1,328 | 735 |
| 7 | 1,575 | 1,685 | 1,415 | 1,420 | 390 |
| 11 | 1,165 | 1,562 | 1,320 | 1,408 | 192 |
| 21 | 1,320 | 1,510 | 948 | 1,302 | 0 |
| 31 | 1,100 | 1,572 | 903 | 1,078 | 0 |
| 41 | 1,048 | 1,040 | 757 | 1,238 | 0 |
| 66 | 947 | 990 | 390 | 1,193 | 0 |
| 84 | 795 | 692 | 322 | 1,042 | 0 |

EXAMPLE 13

The laminar structure of example 3 was laminated to 0.5-mil aluminum foil; the foil was adhered to the acetone-treated FEP surface of the laminar structure. The laminating operation was carried out by combining the two materials in a nip on a drum laminator at speeds of 20 to 30 feet per minute.

Seven different sets of conditions were used. In all cases, the example 3 film was preheated on the heated drum, by taking a wrap of about 90° on the drum before the film entered the nip. The aluminum foil was brought directly into the nip with no wrap. In some cases the resulting laminate was postheated on the drum, by taking a wrap of about 120° on the drum after the nip before removing the film from the drum; in other cases the film was removed from the drum immediately upon exiting from the nip so that there was no post-heating. The samples were tested for adhesion at the FEP/foil interface and the results are shown in table VI below.

TABLE VI

| Drum Temp., °C. | Post-heat | Adhesion, grams/inch (interface failure) |
|---|---|---|
| 230 | yes | 346 (FEP/aluminum) |
| 230 | no | 404 (FEP/aluminum) |
| 235 | no | 420 (FEP/aluminum) |
| 241 | no | 320 (FEP/aluminum) |
| 240 | yes | 458 (both) |
| 272 | yes | 616 (polyimide/FEP) |
| 272 | no | 570 (polyimide/FEP) |

EXAMPLE 14

The laminar structure of example 3 was laminated to 0.5-mil aluminum foil; the foil was adhered to the acetone-treated FEP surface of the laminar structure. The laminating operation was carried out by combining the two materials in a nip on a drum laminator with a drum temperature of 260° C. at a speed of 20 feet per minute.

A control FEP/foil structure similarly constituted, was prepared wherein both surfaces of the FEP film had been treated with glycidyl methacrylate in an electrical discharge and then primed with polyethyleneimine to promote the intralaminar bonds. Samples were tested for adhesion at the FEP/foil interface and the results are given in table VII below.

TABLE VII

| | Example 14 | Control |
|---|---|---|
| Adhesive strength of FEP/aluminum bond, grams/inch | 500 | could not peel |
| Tensile modulus, Kp.s.i. (MD/TD) | 354/303 | 293/302 |
| Elongation, % (MD/TD) | 63/71 | 48/37 |
| Tensile strength, Kp.s.i. (MD/TD) | 15/18 | 12/12 |
| Elongation to initiation of cracks in aluminum | 33 | 23 |

Intralaminar adhesive strength after heat aging in air, grams/inch

| Aging Temp., °C. | Aging Days | | |
|---|---|---|---|
| | 0 | 857 | 593 |
| 175 | 1 | 760 | 997 |
| | 4 | 712 | 718 |
| | 12 | 442 | 340 |
| | 28 | 317 | 197 |
| | 55 | 220 | 27* |
| 200 | 1 | 715 | 683 |
| | 4 | 415 | 198 |
| | 12 | 178 | 17* |
| | 28 | 148 | 0* |
| 225 | 1 | 505 | 232 |
| | 4 | 210 | 0* |
| | 12 | 110* | 0* |
| 250 | 1 | 648 | 225 |
| | 4 | 628 | 38* |
| | 12 | 627 | 0* |

*) Bond failure at polyimide/FEP interface; all other values for bond failure at FEP/aluminum interface.

EXAMPLE 15

A 1-mil polyimide/0.5-mil FEP/0.5-mil aluminum laminate was prepared on a drum laminator in a single laminating step. The FEP film had been treated on both sides with acetone-vapor in an electrical discharge. The polyimide film was preheated on the drum by taking a film wrap against the drum of about 90° before the film entered the nip. The FEP film and aluminum foil were brought directly into the nip between the drum and press roll. The resulting laminate exited from the nip and was wound up. The operation was carried out at a speed of 35 feet per minute. Three different laminates were prepared with the shiny side of the aluminum foil against the FEP film, at lamination drum temperatures of 240° C., 255° C. and 270° C. (samples A, B and C, respectively); a fourth laminate was prepared with the dull side of the aluminum foil against the FEP film at a drum temperature of 255° C. (sample D). The adhesion at the aluminum/FEP interface was 292 grams/inch for sample A, 339 grams/inch for sample B, and 316 grams/inch for sample D.

What is claimed is:

1. A process for laminating together at least one polyimide film having a moisture content below about 1 percent by weight and at least one film of a copolymer of tetrafluoroethylene and hexafluoropropylene, the latter film having at least one surface thereof rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge, which comprises bringing together at least one surface of said polyimide film and said adherable surface of said copolymer film, and holding them together at a temperature in the range of 240° to 280° C. at a pressure in excess of about 10 pounds per square inch for at least 0.01 second to form a unitary laminar structure.

2. The process of claim 1 wherein the laminar structure is subsequently heated to a temperature in the range between about 350° C. and about 500° C. for at least 1 second.

3. The process of claim 1 in which the exposed surface of the copolymer layer of the laminar structure is subsequently rendered adherable by subjecting said surface to an electrical discharge at substantially atmospheric pressure between spaced electrodes, said electrical discharge having an average energy level below 15 electron volts, in an atmosphere containing between about 5 percent by volume and 40 percent by volume of the vapor of acetone in a gaseous carrier medium which sustains the electrical discharge.

4. A process for laminating together a polyimide film having a moisture content below about 1 percent by weight, a first film of a copolymer of tetrafluoroethylene and hexafluoropropylene, and a second film of a copolymer of tetrafluoroethylene and hexafluoropropylene, each of said first and said second films having at least one surface rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge, which comprises simultaneously bringing together said polyimide film and said first and said second copolymer film, with said polyimide film sandwiched in between and contacting the said adherable surfaces of said first and said second copolymer films; holding them together at a temperature in the range of 240° to 280° C. at a pressure in excess of about 10 pounds per square inch for at least 0.01 second to form a three-layer laminar structure.

5. The process of claim 4 wherein the laminar structure is subsequently heated to a temperature in the range between about 350° C. and about 500° C. for at least 1 second.

6. The process of claim 2 including the further step of bringing a thin sheet of metal selected from aluminum and copper into surface contact with said last-mentioned exposed adherable surface of said copolymer film; and holding the entire structure together at a temperature in excess of about 240° C. and a pressure in excess of about 10 pounds per square inch for at least 1 second to form a three-layer laminate.

7. A process for laminating together a polyimide film having a moisture content below about 1 percent by weight, a sheet of metal selected from aluminum and copper and a film of a copolymer of tetrafluoroethylene and hexafluoropropylene, the latter film having both surfaces rendered adherable by subjecting each surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge, which comprises simultaneously bringing together said polyimide film, the metal sheet and said copolymer film, with said copolymer film sandwiched between said polyimide film and the metal sheet; holding them together at a temperature in the range of 240° to 280° C. at a pressure in excess of about 10 pounds per square inch for at least 0.01 second to form a three-layer laminar structure.

8. The process of claim 7 wherein the laminar structure is subsequently heated to a temperature in the range of 350° C. to 500° C. for at least 1 second.

9. A process for making a four-layer laminar structure which comprises taking (1) a polyimide film having a moisture content below about 1 percent by weight and (2) a first film of a copolymer of tetrafluoroethylene and hexafluoropropylene having a surface rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing said polyimide film and said first copolymer film together with the said cementable surface of said first copolymer film in contact with said polyimide film; holding them together at a temperature in the range of 240° to 280° C. at a pressure in excess of about 10 pounds per square inch for at least 0.01 second to form a two-layer laminar structure; bringing together the exposed surface of said polyimide film of said two-layer laminate and the adherable surface of (3) a second film of a copolymer of tetrafluoroethylene and hexafluoropropylene, said adherable surface having been rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; holding the resulting three-layer structure together at a temperature in the range of 240° to 280° C. at a pressure in excess of about 10 pounds per square inch for at least 0.1 second to form a three-layer laminar structure; subjecting the exposed surface of one of said copolymer films of said three-layer laminar structure to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing together said exposed surface of said one of said copolymer films of said three-layer laminate and (4) one surface of a thin sheet of metal selected from aluminum and copper holding the resulting four-layer structure together at a temperature above about 10 pounds per square inch for at least 0.01 second to form a four-layer laminate.

10. A process for making a four-layer laminate which comprises taking (1) a polyimide film having a moisture content below about 1 percent by weight, (2) a first film of a copolymer of tetrafluoroethylene and hexafluoropropylene and (3) a second film of a copolymer of tetrafluoroethylene and hexafluoropropylene, each of said first and said second films having a surface rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; simultaneously bringing together said polyimide film and said first and said second copolymer film, with said polyimide film sandwiched between and contacting the said cementable surfaces of said first and said second copolymer films; holding them together at a temperature in the range of 240° to 280° C. at a pressure in excess of about 10 pounds per square inch for at least 0.01 second to form a three-layer laminar structure; subjecting the exposed surface of one of said copolymer films of said three-layer laminar structure to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing together said exposed surface of said one of said copolymer films of said three-layer laminar structure and (4) one surface of a thin sheet of metal selected from aluminum and copper holding the resulting four-layer structure together at a temperature above about 10 pounds per square inch for at least 0.01 second to form a four-layer laminate.

11. A process for making a five-layer laminar structure which comprises taking (1) a polyimide film having a moisture content below about 1 percent by weight and (2) a first film of a copolymer of tetrafluoroethylene and hexafluoropropylene having a surface rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing said polyimide film and said first copolymer film together with the said cementable surface of said first copolymer film in contact with said polyimide film; holding them together at a temperature in the range of 240° to 280° C. at a pressure in excess of about 10 pounds per square inch for at least 0.01 second to form a two-layer laminar structure; bringing together the exposed surface of said polyimide film of said two-layer laminate and the adherable surface of (3) a second film of a copolymer of tetrafluoroethylene and hexafluoropropylene, said adherable surface having been rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; holding the resulting three-layer structure together at a temperature in the range of 240° to 280° C. at a pressure in excess of about 10 pounds per square inch for at least 0.1 second to form a three-layer laminar structure; subjecting the exposed surfaces of both of said copolymer films of said three-layer laminar structure to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing (4) and (5) two thin sheets of metal selected from aluminum and copper, one each, in contact with said exposed surfaces of said copolymer films of said three-layer laminar structure; holding the resulting five-layer structure together at a temperature above about 10 pounds per square inch for at least 0.01 second to form a five-layer laminate.

12. A process for making a five-layer laminar structure which comprises taking (1) a polyimide film having a moisture content below about 1 percent by weight, (2) a first film of a copolymer of tetrafluoroethylene and hexafluoropropylene and (3) a second film of a copolymer of tetrafluoroethylene and hexafluoropropylene, each of said first and said second films having a surface rendered adherable by subjecting said surface to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; simultaneously bringing together said polyimide film and said first and said second copolymer film, with said polyimide film sandwiched between and contacting the said cementable surfaces of said first and said second copolymer films; holding them together at a temperature in the range of 240° to 280° C. at a pressure in excess of about 10 pounds per square inch for at least 0.01 second to form a three-layer laminar structure; subjecting the exposed surfaces of both of said copolymer films of said three-layer structure to an electrical discharge at substantially atmospheric pressure between spaced electrodes, said electrical discharge having an average energy level below 15 electron volts, in an atmosphere containing between about 5 percent by volume and about 40 percent by volume of the vapor of acetone in a gaseous carrier medium which sustains the electrical discharge; bringing (4) and (5) two thin sheets of metal selected from aluminum and copper, one each, in contact with said exposed surfaces of said copolymer films of said three-layer structure; holding the resulting five-layer structure together at a temperature above about 10 pounds per square inch for at least 0.01 second to form a five-layer laminar structure.

13. The two-layer laminar structure prepared as in claim 1.

14. The laminar structure of claim 13 wherein the layer of polyimide is of a thickness between about 0.25 mil and about 10 mils.

15. The laminar structure of claim 14 wherein said copolymer is between about 5 percent and about 50 percent by weight, based upon the total copolymer weight, of hexafluoropropylene and between about 50 percent and about 95 percent by weight, based upon the total copolymer weight, of tetrafluoroethylene.

16. The laminar structure of claim 15 wherein the layer of said copolymer is between about 0.25 mil and about 10 mils thick.

17. The laminar structure of claim 16 wherein said polyimide is of the following recurring structural unit:

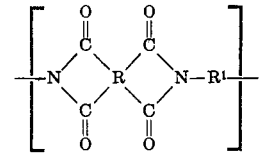

where R is a tetravalent aromatic organic radical including the following and substituted derivatives thereof:

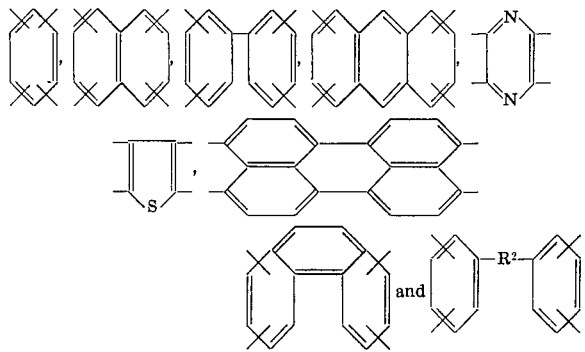

where $R^2$ is alkylene of 1–3 carbon atoms, oxygen, sulfur, or one of the following:

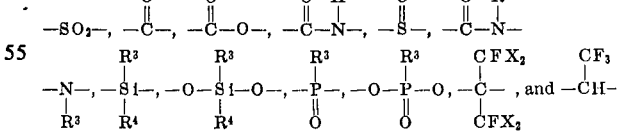

wherein $R^3$ and $R^4$ are alkyl or aryl, and substituted groups thereof, and each X is separately chosen from the group consisting of F and Cl, the said R being such as obtained from a dianhydride of the formula

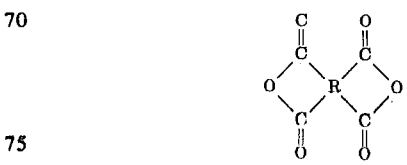

where R has the same meaning as above; and where $R^1$ is a divalent radical containing at least two carbon atoms including one of the following groups: phenylene, naphthylene, biphenylene, anthrylene, furylene, benzfurylene, and

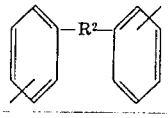

wherein $R^2$ is as defined above, and the nitrogen atoms of adjacent polyimide units being attached to separate carbon atoms of said divalent radical.

18. The two layer laminate prepared as in claim 2.
19. The three-layer laminate prepared as in claim 3.
20. The three-layer laminate prepared as in claim 4.
21. The three-layer laminate prepared as in claim 5.
22. The three-layer laminate prepared as in claim 6.
23. The three-layer laminate prepared as in claim 7.
24. The three-layer laminate prepared as in claim 8.
25. The four-layer laminate prepared as in claim 9.
26. The four-layer laminate prepared as in claim 10.
27. The five-layer laminate prepared as in claim 11.
28. The five-layer laminate prepared as in claim 12.

* * * * *